(12) United States Patent
Brumley et al.

(10) Patent No.: US 9,183,396 B2
(45) Date of Patent: Nov. 10, 2015

(54) DETECTING EXPLOITABLE BUGS IN BINARY CODE

(71) Applicant: Carnegie Mellon University, Pittsburgh, PA (US)

(72) Inventors: David Brumley, Pittsburgh, PA (US); Sang Kil Cha, Pittsburgh, PA (US); Thanassis Avgerinos, Pittsburgh, PA (US); Alexandre Rebert, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 13/898,824

(22) Filed: May 21, 2013

(65) Prior Publication Data

US 2013/0312103 A1 Nov. 21, 2013

Related U.S. Application Data

(60) Provisional application No. 61/688,746, filed on May 21, 2012.

(51) Int. Cl.
*G06F 21/57* (2013.01)
*G06F 11/36* (2006.01)

(52) U.S. Cl.
CPC .......... *G06F 21/577* (2013.01); *G06F 11/3688* (2013.01)

(58) Field of Classification Search
CPC .............. G06F 9/505; G06F 2209/509; G06F 11/3604; G06F 11/3688
USPC ........................................... 726/25; 717/127
See application file for complete search history.

(56) References Cited

U.S. PATENT DOCUMENTS

| | | | |
|---|---|---|---|
| 6,795,966 B1 * | 9/2004 | Lim et al. ........................... | 718/1 |
| 2003/0084435 A1 * | 5/2003 | Messer et al. .................. | 717/174 |
| 2004/0133777 A1 * | 7/2004 | Kiriansky et al. ............. | 713/166 |
| 2009/0113550 A1 * | 4/2009 | Costa et al. ..................... | 726/25 |
| 2009/0265692 A1 | 10/2009 | Godefroid et al. | |
| 2013/0174258 A1 * | 7/2013 | Livshits et al. ................. | 726/24 |

OTHER PUBLICATIONS

Avgerinos, T., et al., "AEG: Automatic exploit generation", In Proc. of the Network and Distributed System Security Symposium, (Feb. 2011), 1-18.

Babic, Domagoj, et al., "Statically-Directed Dynamic Automated Test Generation", International Symposium on Software Testing and Analysis; ACM Press, (2011), 12-22.

(Continued)

*Primary Examiner* — Dao Ho
(74) *Attorney, Agent, or Firm* — Schwegman Lundberg & Woessner, P.A.

(57) ABSTRACT

Systems and methods for performing hybrid symbolic execution to detect exploitable bugs in binary code are described. In some example embodiments, the systems and methods determine that resources associated with an execution client performing symbolic execution of a target program are below, at, or above a threshold performance level, generate checkpoints for active executing paths of the online symbolic execution, and cause the execution client to perform symbolic execution in response to the determination that the resources are at or above the threshold performance level.

14 Claims, 10 Drawing Sheets

(56) References Cited

OTHER PUBLICATIONS

Balakrishnan, G., et al., "Analyzing memory accesses in x86 executables", Proc. of the International Conference on Compiler Construction, (2004), 1-18.

Brumley, David, et al., "Automatic patch based exploit generation is possible: Techniques and implications", Proc. of the IEEE Symposium on Security and Privacy, (May 2008), 1-16.

Cadar, Cristian, et al., "KLEE: Unassisted and automatic generation of high-coverage tests for complex systems programs", Proc. of the USENIX Symposium on Operating System Design and Implementation, (Dec. 2008), 1-14.

Chipounov, Vitaly, et al., "S2E: A Platform for In-Vivo Multi-Path Analysis of Software Systems", Proc. of the International Conference on Architectural Support for Programming Languages and Operating Systems, (2011), 265-278.

Costa, Manuel, et al., "Bouncer: Securing software by blocking bad input", Symposium on Operating Systems Principles, (Oct. 2007), 1-14.

Godefroid, Patrice, et al., "Automated whitebox fuzz testing", Proc. of the Network and Distributed System Security Symposium;, (Feb. 2008), 1-16.

Heelan, Sean, "Automatic Generation of Control Flow Hijacking Exploits for Software Vulnerabilities", Technical Report MSc Thesis, Oxford University, (2002), 110.

Jager, Ivan, et al., "BAP: A binary analysis platform", Proc. of the Conference on Computer Aided Verification, (2011), 7 pgs.

King, James, "Symbolic execution and program testing", Communications of the ACM, 19, (1976), 386-394.

Majumdar, Rupak, et al., "Hybrid concolic testing", Proc. of the ACM Conference on Software Engineering, (2007), 416-426.

Moser, Andreas, et al., "Exploring multiple execution paths for malware analysis", Proc. of the IEEE Symposium on Security and Privacy, (2007), 231-245.

Newsome, James, et al., "Dynamic taint analysis for automatic detection, analysis, and signature generation of exploits on commodity software", Proc. of the Network and Distributed System Security Symposium, (Feb. 2005), 17 pgs.

Schwartz, Edward J., et al., "All you ever wanted to know about dynamic taint analysis and forward symbolic execution (but might have been afraid to ask)", Proc. of the IEEE Symposium on Security and Privacy, (May 2010), 317-331.

Schwartz, Edward J., et al., "Q: Exploit hardening made easy", Proc. of the USENJX Security Symposium, (2011), 16 pgs.

\* cited by examiner

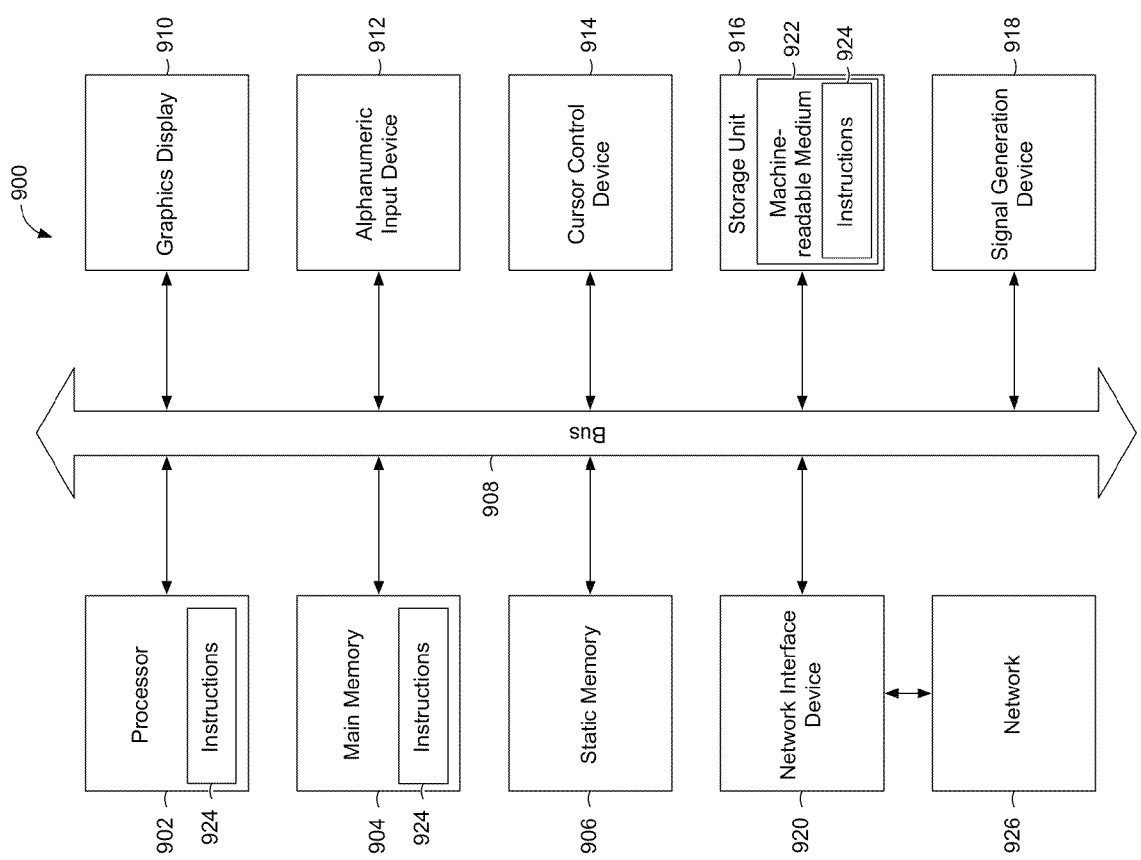

DETECTING EXPLOITABLE BUGS IN BINARY CODE

CROSS REFERENCE TO RELATED APPLICATIONS

This application claims priority to U.S. Provisional Patent Application No. 61/688,746, filed on May 21, 2012, entitled SYSTEM FOR DETECTION OF EXPLOITABLE BUGS IN BINARY CODE, which is hereby incorporated by reference in its entirety.

STATEMENT REGARDING FEDERALLY SPONSORED RESEARCH AND DEVELOPMENT

This invention was made in part with government support under DARPA grant N11AP200005/D11AP00262. The United States government may have certain rights in this invention.

TECHNICAL FIELD

The subject matter disclosed herein generally relates to computer security. Specifically, the present disclosure addresses systems and methods to detect exploitable bugs in binary code.

BACKGROUND

An exploit, such as a control flow exploit, may allow an attacker to perform harm to a computer. Typically, an attacker will manually review the code of a software program, identify a vulnerability, or bug, and attempt to exploit that vulnerability. If the vulnerability is exploitable, the attacker may seize control of the software, and any computing device running the software, until the exploit is discovered and removed, and the vulnerability is fixed. Alternatively, the attacker's exploit may steal sensitive information, or launch unauthorized commands, or cause other malice.

Manual, or somewhat automated, techniques can be suitable for attackers when seeking vulnerabilities, as they only need to find one exploitable bug to be successful in compromising a computing system. However, computer security professionals cannot rely on a manual review of software alone, as they would ideally like to identify and fix any and all exploitable bugs in software before certifying that software as secure. Otherwise, that software could be compromised.

Symbolic execution (or, symbolic evaluation), refers to analyzing programs by tracking symbolic values. A computer security professional may utilize and/or perform symbolic execution on a program in order to detect vulnerabilities in the program, because the symbolic execution is capable of reasoning about all inputs that take the same paths through a program, which may identify the vulnerabilities in the program, among other things. Existing symbolic execution frameworks include Bouncer, BitFuzz, BitTurner, FuzzBall, McVeto, SAGE, and S2E, CUTE, BitBlaze, KLEE, and others.

BRIEF DESCRIPTION OF THE DRAWINGS

Some embodiments are illustrated by way of example and not limitation in the figures of the accompanying drawings.

FIG. 9 is a block diagram illustrating components of a machine, according to example embodiments, able to read instructions from a machine-readable medium and perform any one or more of the methodologies discussed herein.

DETAILED DESCRIPTION

Example systems and methods that perform hybrid symbolic execution (e.g., various combinations of offline and online symbolic execution) in order to detect exploitable bugs and other vulnerabilities in binary (e.g., executable) code are described. The systems and methods may also perform index-based memory modeling in order to optimize the detection of exploitable bugs, among other things.

In some example embodiments, the systems and methods determine that resources (e.g., memory, processors, and so on) associated with an execution client performing online symbolic execution of a target program are at or above a threshold performance level, and cause the execution client to perform offline symbolic execution in response to the determination that the resources are at or above the threshold performance level. The systems and methods may generate checkpoints for active executing paths of the online symbolic execution before switching from online to offline symbolic execution, in order to restore the state of the symbolic execution when switching back to online execution. Also, the systems and methods may generate checkpoints of the active path of the offline symbolic execution before switching back to online symbolic execution.

In some example embodiments, the systems and methods perform symbolic execution on target binary code using a first mode of symbolic execution, determine the first mode of symbolic execution has exhausted resources (e.g., memory and/or processor utilization, and so on) associated with the symbolic execution, performs symbolic execution on the target binary code using a second mode of symbolic execution, and detects one or more bugs within the target binary code based on the performed symbolic executions. In some example embodiments, the first mode may be under-utilizing one or more resources, which causes the utilization of the second mode of operation.

Thus, the systems and methods described herein provide a hybrid execution engine that performs online symbolic execution when resources are below certain use levels and offline symbolic execution when the resources are above the use levels, among other things. The hybrid execution engine, therefore, may provide and/or enable an efficient, scalable system for detecting exploitable bugs in binary code, among other benefits.

Example Computing Environment

Figure 1:
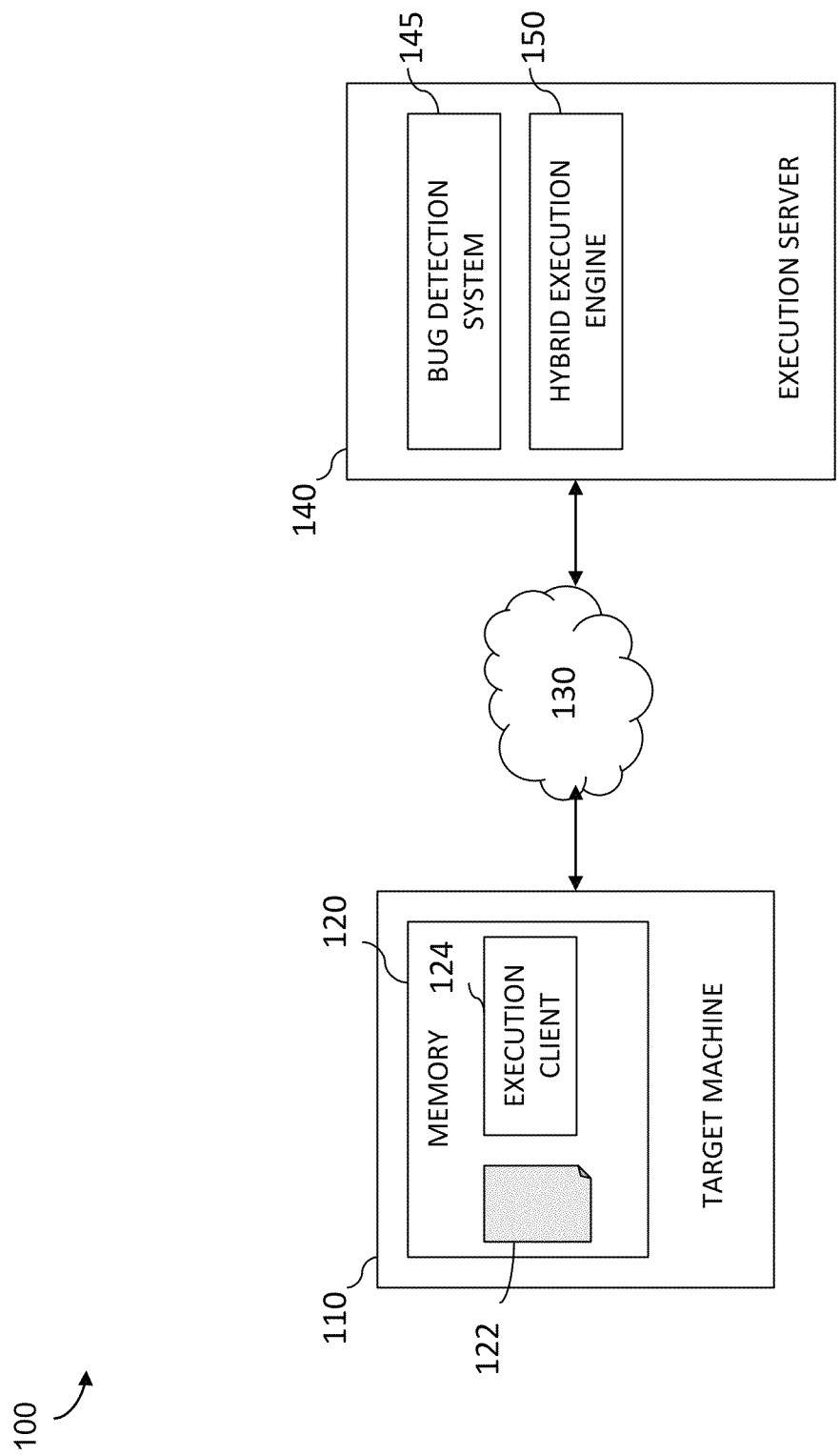
FIG. 1 is a block diagram illustrating a suitable computing environment for detecting exploitable bugs in binary code, in some example embodiments.

FIG. 1 is a block diagram illustrating a suitable computing environment 100 for detecting exploitable bugs in binary code, in some example embodiments. The computing environment 100 includes a target machine 110 that stores target code 122 (e.g., binary or executable code) within the memory 120 of the target machine 110. The target machine 110 also includes an execution client 124 that is configured to perform symbolic execution on the target code 122 within the memory 120 of the target machine 110.

The target machine 110 may communicate with an execution server 140 over a network 130. The network 130 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, any other type of network, or a combination of two or more such networks.

The execution server 140 may include various components, modules, and/or engines configured to perform, manage, and/or utilize the symbolic execution of target code 122. For example, the execution server 140 includes a bug detection system 145 that is configured to perform (or, cause to perform), symbolic execution, via the execution client 124, on the target code 122 and generate (e.g., automatically) one or more exploits in response to the detection of exploitable bugs and other vulnerabilities within the target code 122 by performed symbolic executions.

In some example embodiments, the execution server also includes a hybrid execution engine 150 that is configured to manage and/or determine the type (e.g., online or offline) symbolic execution to perform on the target code 122, among other things.

Figure 2:
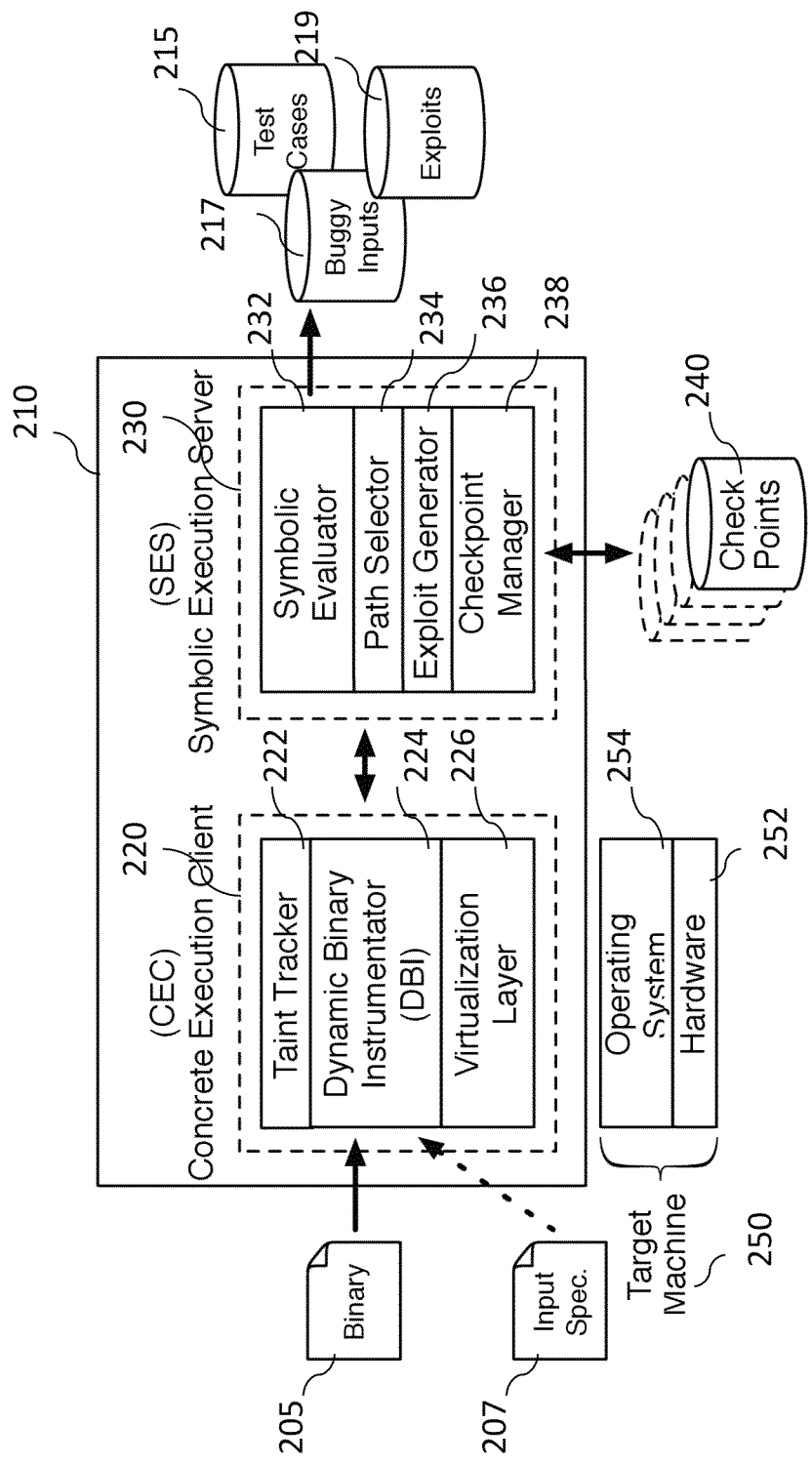
FIG. 2 is a block diagram illustrating a bug detection system, in some example embodiments.

Further details regarding the execution client 124 and the execution server 140 are described with respect to FIG. 2. FIG. 2 is a block diagram illustrating components of a bug detection system 210, in some example embodiments.

A target machine 250, supporting an operating system 254 via various hardware devices and components 252, includes and/or executes a target code snippet 205. An example of target code snippet 205, orzHttpd, is shown below (in source code, for ease of illustration):

```
#define BUFSIZE 4096
typedef struct {
    char buf[BUFSIZE];
    int used;
} STATIC_BUFFER_t;
typedef struct conn {
    STATIC_BUFFER_t read_buf;
    ... // omitted
} CONN_t;
static void serverlog(LOG_TYPE_t type,
            const char *format, ...)
{
    ... // omitted
    if(format != NULL) {
        va_start(ap, format);
        vsprintf(buf, format, ap);
        va_end(ap);
    }
    fprintf(log, buf); // vulnerable point
    fflush(log);
}
HTTP_STATE_t http_read_request(CONN_t *conn)
{
    ... // omitted
    while(conn->read_buf.used < BUFSIZE) {
        sz = static_buffer_read(conn, &conn->read_buf);
        if(sz < 0) {
            ...
            conn->read_buf.used += sz;
```

-continued

```
            if(memcmp(&conn->read_buf.buf[conn->read_buf.used] - 4,
"\r\n\r\n", 4) == 0)
            {
                break;
            }
    }
    if(conn->read_buf.used >= BUFSIZE) {
        conn->status.st = HTTP_STATUS_400;
        return HTTP_STATE_ERROR;
    }
    ...
    serverlog(ERROR_LOG,
            "%s\n",
            conn->read_buf.buf);
    ...
}
```

Referring to the example, in orzHttpd, each HTTP connection is passed to http_read_request. This routine in turn calls static_buffer_read as part of the loop on line 29 to get the user request string. The user input is placed into the 4096-byte buffer conn->read_buf.buf on line 30. Each read increments the variable conn->read_buf.used by the number of bytes read so far in order to prevent a buffer overflow. The read loop continues until \r\n\r\n is found, checked on line 34. If the user passes in more than 4096 bytes without an HTTP end-of-line character, the read loop aborts and the server returns a 400 error status message on line 41. Each non-error request gets logged via the serverlog function.

Following the example, there is a vulnerability in serverlog, which calls fprintf with a user specified format string (an HTTP request). Variadic functions such as fprintf use a format string specifier to determine how to walk the stack looking for arguments. An exploit for this vulnerability may work by supplying format strings that cause fprintf to walk the stack to user-controlled data. The exploit then uses additional format specifiers to write to the desired location.

Various factors may dictate the detection of exploitable bugs in the target code 205. Example factors include:

Low-level details matter, because determining exploitability requires that a system reason about low-level details, such as return addresses and stack pointers;

There are an enormous number of paths to check. Referring to the example, there is a new path on every encounter of an if statement, which may lead to an exponential path explosion. Additionally, the number of paths in many portions of the code is related to the size of the input. For example, memcmp unfolds a loop, creating a new path for symbolic execution on each iteration. Longer inputs mean more conditions, more forks, and harder scalability challenges. Unfortunately, most exploits are not short strings (e.g., in a buffer overflow typical exploits are hundreds or thousands of bytes long);

The more checked paths, the better. To reach the exploitable fprintf bug in the example code, a symbolic execution engine may reason through the loop, read input, fork a new interpreter for every possible path, and check for errors. Without careful resource management, the engine may be hindered by too many symbolic execution threads, because of the huge number of possible execution paths, among other things; and Perform native execution when possible. Symbolic execution is slow compared to concrete execution, because the semantics of an instruction are simulated in software. In orzHttpd, millions of instructions set up a basic server before an attacker can even connect to a socket. A symbolic execution engine may first execute these instructions concretely, and then switch to symbolic execution.

Referring back to FIG. 2, a user may initiate the review and detection of exploitable bugs within target code 205 (e.g. orzHttpd,), by running the following command line:

Mayhem -sym-net 80 400./orzhttpd, which causes the bug detection system 210 to symbolically execute orzHttpd, and open sockets on port 80 to receive symbolic 400-byte long packets. The bug detection system 210 includes two components that concurrently run, a Concrete Executor Client (CEC) 220, which executes code natively on a CPU (e.g., target machine 250), and a Symbolic Executor Server (SES) 230. The CEC 220 runs on the target machine 250, and the SES 230 runs on any platform, waiting for connections from the CEC 220. The CEC 220 takes in target binary code or program 205 along with potential symbolic sources (e.g., input specification 207) as an input, and begins communication with the SES 230. The SES 230 symbolically executes blocks received from the CEC 220, and outputs several types of test cases, including normal test cases 215, crashes or buggy inputs 217, and/or exploits 219.

The CEC 220 takes in the target binary code 205, a list 207 of input sources to be considered symbolic, and an optional checkpoint input that contains execution state information from a previous run. The CEC 220 concretely executes the program 205, hooks input sources and performs taint analysis on input variables 207. Every basic block that contains tainted instructions is sent from the CEC 220 to the SES 230 for symbolic execution. As a response, the CEC 220 receives the address of the next basic block to be executed and whether to save the current state as a restoration point. Whenever an execution path is complete, the CEC 220 context-switches to an unexplored path selected by the SES 230 and continues execution. The CEC 220 terminates only if all possible execution paths have been explored or a threshold is reached. When a checkpoint is provided by the SES 230, the CEC 220 first executes the program concretely until the checkpoint and then continues execution as before.

The SES 230 manages the symbolic execution environment and decides which paths are executed by the CEC 220. The environment consists of a symbolic executor for each path, a path selector, which determines which feasible path to run next, and a checkpoint manager, which generates and/or manages checkpoints, such as checkpoints stored in checkpoint database 240.

In some example embodiments, the SES 230 caps the number of symbolic executors based on resource usage. When a resource limit is reached, the SES 230 stops generating new interpreters and produces checkpoints, which may be execution states that will explore program paths that the SES 230 was unable to explore in the first run, due to a resource cap. Each checkpoint is prioritized and used by the SES 230 to continue exploration of these paths at a subsequent run. Thus, when all pending execution paths terminate, the SES 230 selects a new checkpoint and continues execution, until all checkpoints are consumed, among other things.

For example, the bug detection system 210 may perform some or all of the following operations when detecting exploitable bugs in target binary code 205:

The bug detection system 210 reads the -sym-net 80 400 argument, which is a request perform symbolic execution on data read in from a socket on port 80. Effectively, the input is specifying which input sources are potentially under attacker control. The bug detection system 210 may handle attacker input from environment variables, files, and/or the network.

The CEC 220 loads the vulnerable program and connects to the SES 230 to initialize all symbolic input sources. After the initialization, the bug detection system 220 executes the binary concretely on the CPU in the CEC 220. During execution, the CEC 220 utilizes a Dynamic Binary Instrumenter (DBI) 224 to instrument the code, and utilizes a taint tracking engine 222 to perform dynamic taint analysis. The taint tracking engine 222 may check if a block contains tainted instructions, where a block is a sequence of instructions that ends with a conditional jump or a call instruction, among other things.

When the CEC 220 encounters a tainted branch condition or jump target, it suspends concrete execution. A tainted jump may indicate that the target code binary 205 may be dependent on attacker input. The CEC 220 sends the instructions to the SES 230, and the SES 230, determines which branches are feasible. The CEC 220 may later receive the next branch target to explore from the SES 230.

The SES 230, running in parallel with the CEC 220, receives a stream of tainted instructions from the CEC 220. The SES 230 translates the instructions to an intermediate language (IL), and symbolically executes, using a symbolic evaluator 232, the corresponding IL. The CEC 220 provides any concrete values whenever needed (e.g., when an instruction operates on a symbolic operand and a concrete operand).

As described herein, symbolic execution is performed on assembly instructions (e.g., binary code) as they execute. The SES 230 may leverage BAP, a binary analysis framework, to convert x86 assembly to an intermediate language suitable for symbolic execution. For each instruction executed, a symbolic executor (e.g., symbolic evaluator 232) translates the instruction to the BAP IL (Intermediate Language). The SES 230 performs symbolic execution directly on the IL, introduces additional constraints related to specific attack payloads, and sends the formula to the SMT solver to check satisfiability. For example, the IL for a ret instruction consists of two statements: one that loads an address from memory, and one that jumps to that address.

During concrete execution, when a program is given a concrete value as input, the program executes statements to produce new values, and terminates with final values. In symbolic execution, execution is not restricted to a single value, but instead provide a symbolic input variable that represents the set of all possible input values. The symbolic evaluator 232, or symbolic execution engine, evaluates expressions for each statement in terms of the original symbolic inputs. When symbolic execution hits a branch, it considers two possible scenarios: one where the true branch target is followed, and one where the false branch target is followed. The engine 232 does so by forking off an interpreter for each branch, and asserting a generated formula that should be satisfied. A final formula encapsulates all branch conditions that should be met to execute the given path, and is called the path formula, or path predicate.

The IL statement type has a corresponding symbolic execution rule. Assertions in the IL are immediately appended to the formula. Conditional jump statements create two formulas: one where a branch guard is asserted true and the true branch is followed, and one which asserts the negation of the guard and the false branch is followed.

For example, given formula f, if the engine 232 executes cjmp $e_1$, $e_2$, $e_3$ where $e_1$ is the branch guard and $e_2$ and $e_3$ are jump targets, two formulas are generated:

$$f \wedge e_1 \wedge FSE(\text{path}_{e_2})$$

and $$f \wedge \neq e_1 \wedge FSE(\text{path}_{e_3})$$

where FSE stands for forward symbolic execution of the jump target.

The SES 230 maintains two types of formulas: a path formula and an exploitability formula. The path formula reflects the constraints to reach a particular line of code. Each conditional jump adds a new constraint on the input. For example, lines 32-33 of the example code create two new paths: one which is constrained so that the read input ends in an \r\n\r\n and line 35 is executed, and one where the input does not end in \r\n\r\n and line 28 will be executed. The exploitability formula determines whether the attacker can gain control of the instruction pointer, and/or execute a payload.

When the bug detection system 210 encounters a tainted branch point, the SES 230 determines whether to fork execution by querying a Satisfiability Modulo Theories (SMT) solver. If fork execution is determined, all the new forks are sent to a path selector 234 to be prioritized. Upon picking a path, the SES 230 notifies the CEC 220 about the change (e.g., the selected path) and a corresponding execution state is restored. When a system resource cap is reached (e.g., when memory resources of the target machine are at or above a threshold), then a checkpoint manager 238 generates checkpoints instead of forking new executors. The SES may then generate test cases 215 for the terminated executors, and the SES 230 identifies to the CEC 220 the checkpoint at which to continue symbolic execution.

During the execution, the SES 230 switches context between executors (e.g., between online and offline executors), and the CEC 220 checkpoints/restores the provided execution state and continues symbolic execution. The CEC 220 may maintain a virtualization layer via a virtualization layer engine 226 to handle the program interaction with various components, and checkpoint/restore between multiple program execution states.

When the bug detection system 210 detects a potential bug, such as a tainted jump instruction, it builds an exploitability formula, and queries the SMT solver to see if it is satisfiable. A satisfying input will be, by construction, an exploit. If no exploit is found, the SES 230 continues to explore execution paths.

The bug detection system 210 performs the above operations at some or all branches within the targer binary code until an exploitable bug is found, which is then automatically generated by the exploit generator 236, the system 210 hits a user-specified maximum runtime, or all paths are exhausted, among other things.

FIGS. 1 and 2 and the discussion herein provide a brief, general description of a suitable computing environment 100 in which exploitable bugs are detected in binary code. Although not required, aspects of the environment 100 and bug detection system 210 are described in the general context of computer-executable instructions, such as routines executed by a general-purpose computer, e.g., a server computer, personal computer, mobile device, and so on. Those skilled in the relevant art will appreciate that the bug detection system 210 can be practiced with other communications, data processing, or computer system configurations, including: Internet appliances, hand-held devices (including personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," are generally used interchangeably herein, and refer to any of the above devices and systems, as well as any data processor.

Aspects of the example system can be embodied in a special purpose computing device or data processor that is specifically programmed, configured, or constructed to perform one or more of the computer-executable instructions explained in detail herein. Aspects of the example embodiments of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the example embodiments of the system may be stored or distributed on computer-readable media (e.g. tangible computer-readable media, computer-readable storage media, tangible computer-readable storage media, and so on), including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the system reside on a server computer, while corresponding portions reside on a client computer, and thus, while certain hardware platforms are described herein, aspects of the system are equally applicable to nodes on a network.

The computing environment 100 and the devices 110 and/or 120 may each be implemented in a computer system, in whole or in part, as described below with respect to FIG. 9. Any of the machines, databases, or devices shown in FIG. 1 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 9. As used herein, a "database" includes a data storage resource and may store data structured as a text file, a table, a spreadsheet, a relational database (e.g., an object-relational database), a triple store, a hierarchical data store, or any suitable combination thereof. Moreover, any two or more of the machines illustrated in FIG. 1 may be combined into a single machine, and the functions described herein for any single machine may be subdivided among multiple machines.

In some example embodiments embodiment, the bug detection system 210 is written in C/C++ and OCaml code. However, the choice of implementing languages may be any general purpose programming language such as Java, JavaScript, Microsoft.Net, and so on. The binary instrumentation framework 224 may be built on Pin and all the hooks for modeled system and API calls may be written in C/C++. The symbolic execution engine 232 may be written in OCaml. The bug detection system 210 may utilize BAP [9] to convert assembly instructions to the IL, and Z3 as our decision procedure, with direct OCaml bindings. Communication between components may be facilitated by a cross-platform, light-weight RPC protocol (both in C++ and OCaml), including various execution modes, including online, offline and hybrid modes Examples of Detecting Bugs in Binary Code As described herein, the bug detection system 210 may utilize a hybrid execution engine 150 to combine online and offline symbolic execution approaches where execution alternates between online and offline symbolic execution runs. The hybrid execution engine 150 may act similar to a memory manager in an operating system (OS), because it may efficiently swap out symbolic execution engines (e.g, offline and online execution engines). For example, when memory or another resource is under pressure (e.g. resources are at or above a threshold use level) or under-utilized (performing under a minimum threshold level), the hybrid execution engine 150 may select a running executor (e.g., a running thread), and saves a current execution state and path formula for the selected executor.

The hybrid execution engine 150 may then restore thread by restoring the formula, concretely running the target program to the previous execution state, and continue to execute the thread.

In some example embodiments, the hybrid execution engine 150 may also cache the path formulas to prevent the symbolic re-execution of instructions, which may cause a bottleneck in offline execution, while managing memory more efficiently than online execution, among other things.

In some example embodiments the hybrid execution engine 150 reasons about symbolic memory. For example, a symbolic memory access occurs when a load or store address depends on input. Symbolic pointers are common at the binary level, and the engine 150 may reason about the pointers to generate control-hijack exploits. The hybrid execution engine 150, therefore, may generate and/or employ an index-based memory model to avoid constraining the index whenever possible, among other things.

Thus, in some example embodiments, the hybrid execution engine 150, in collaboration with the bug detection system 210, provides the first end-to-end binary-only exploitable bug finding system that demonstrates exploitability by outputting working control hijack exploits. In some example embodiments, the bug detection system 210 provides an end-to-end binary-only exploitable bug finding system for leaking sensitive data and command injection attacks, among other things.

In order to explore a suitable amount of state space of an application to identify the exploitable bugs, a system should be able to perform the following:

Performing offline or online symbolic execution only cannot achieve operational capabilities efficiently. Offline symbolic execution concretely runs a single execution path and then symbolically executes the path (also known as trace-based or concolic executors, e.g., SAGE). Offline symbolic execution reasons about a single execution path at a time. Every run of offline execution will restart execution of a program from the beginning Offline symbolic execution uses two inputs: the target program and an initial seed input. An offline executor concretely executes the program on the seed input, records a trace, and symbolically executes the instructions in the recorded trace. This approach is called concolic execution, a juxtaposition of concrete and symbolic execution. Offline execution is beneficial because of its simplicity and low resource requirements, because it only handles a single execution path at a time.

Online symbolic execution executes some or all possible paths in a single run (e.g., S2E). For example, online symbolic execution forks at each branch point. Previous instructions are not re-executed, but the continued forking puts a strain on memory, slowing down the online execution as the number of branches increase. Some online executors, such as KLEE, stop forking to avoid being slowed down by their memory use. Online symbolic execution avoids the re-execution cost by forking two interpreters at branch points, each one having a copy of the current execution state. Thus, to explore a different path, online execution perform a context switch to the execution state of a suspended interpreter. For example, S2E KLEE, and AEG, follow the approach by performing online symbolic execution on LLVM bytecode, among other things. However, forking off a new executor at each branch may quickly strain memory resources associated with the symbolic execution, among other things.

Figure 3:
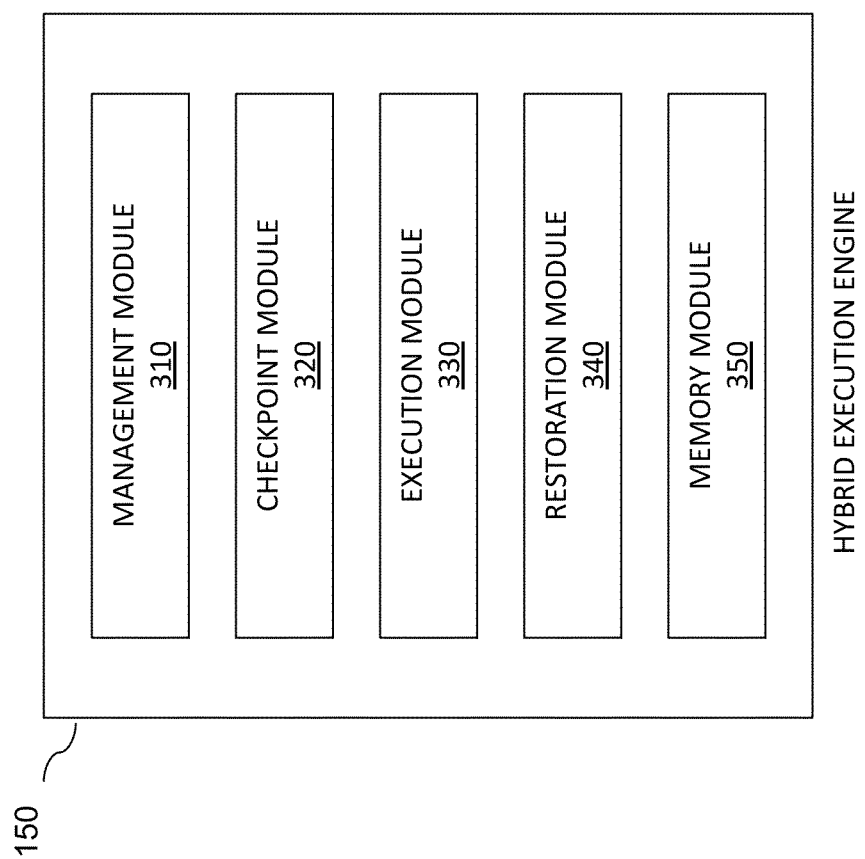
FIG. 3 is a block diagram illustrating components of a hybrid execution engine, in some example embodiments.

As described herein, the hybrid execution engine 150 facilitates the use of both online and offline symbolic execution, utilizing the advantages of both approaches without realizing the drawbacks described herein. FIG. 3 is a block diagram illustrating components of a hybrid execution engine 150, in some example embodiments. The hybrid execution engine 150 includes a management module 310, a checkpoint module 320, an execution module 330, a restoration module 340, and a memory module 350, among other things.

One skilled in the art will appreciate that the functional modules are implemented with a combination of software (e.g., executable instructions, or computer code) and hardware (e.g., at least a memory and processor). Accordingly, as used herein, in some embodiments a module is a processor-implemented module and represents a computing device having a processor that is at least temporarily configured and/or programmed by executable instructions stored in memory to perform one or more of the particular functions that are described herein.

In some example embodiments, the management module 310 is configured and/or programmed to monitor the operation of resources associated with an execution client performing online or offline symbolic execution of a target program. For example, the management module 310 may determine that a memory cap or threshold has been reached, such as a cap that identifies a condition associated with a low or unsuitable performance level (e.g., a slow performance) for a running symbolic execution, and/or that a resource performance is under a minimum threshold or sufficient level of performance.

In some example embodiments, the management module 310 may start analysis in an online or offline mode. The management module 310 may monitor and/or track operations, in order to distribute online execution tasks into subtasks, without losing potentially interesting paths.

Before symbolic execution beegins, the management module 310 may initializes the checkpoint manager 238, the checkpoint database 240, and test case directories, and then may cause execution of the target program in online of offline mode, possibly alternating or switching between the two modes.

During online execution, the bug detection system 210 symbolically executes the target program in an online fashion, context-switching between current active execution states, and generating test cases 215. The management module 310, which may be integrated with or a part of the checkpoint manager 238, monitors performance information associated with the online execution. When the memory utilization reaches a cap or threshold, or the number of running executors exceeds a threshold, the management module 310 switches, or causes a switch, to offline execution.

In some example embodiments, the checkpoint module 320 is configured and/or programmed to generate checkpoints for active executing paths of the online symbolic execution. For example, the checkpoint 320 may interact with and/or be part of checkpoint manager, and generate checkpoints, such as checkpoints stored in database 240.

Before or during offline execution mode, the bug detection system 210 may not fork new states in memory. Instead, the system 210 may select and generate a checkpoint for each newly forked executor. A checkpoint contains the symbolic execution state of the suspended executor (path predicate, statistics, and so on) and replay information. In some example embodiments, the concrete execution state is discarded, and may be recovered by concretely executing the program.

In some example embodiments, the execution module 330 is configured and/or programmed to cause the execution client 220 to perform switch between online and offline symbolic execution based on a performance level of the operations of monitored resources, such as based on a determination that memory or processing resources are at or above a threshold performance level. For example, the execution module 330 may interact with and/or be part of the SES 230, such as the symbolic evaluator 232, and initiate and/or intruct the CEC 220 to switch from an online to an offline symbolic execution. When the utilization and/or performance falls below a threshold—for example, because enough active execution paths are fully explored—the management module 310 may dictate a switch back to online execution.

In some example embodiments, the restoration module 340 is configured and/or programmed to restore the checkpoints for the active executing paths of the online symbolic execution. For example, the restoration module 340 may restore the checkpoints when all active execution paths are finished—either in online or offline mode.

The management module 310 may select a checkpoint to be restored based on a ranking heuristic, and restore the checkpoint in memory. Because the symbolic execution state was saved with the checkpoint, the restoration module 340 may re-construct the concrete execution state by concretely executing the program using one satisfiable assignment of the path predicate as input, until the target program reaches the instruction when the execution state was suspended.

Figure 4:
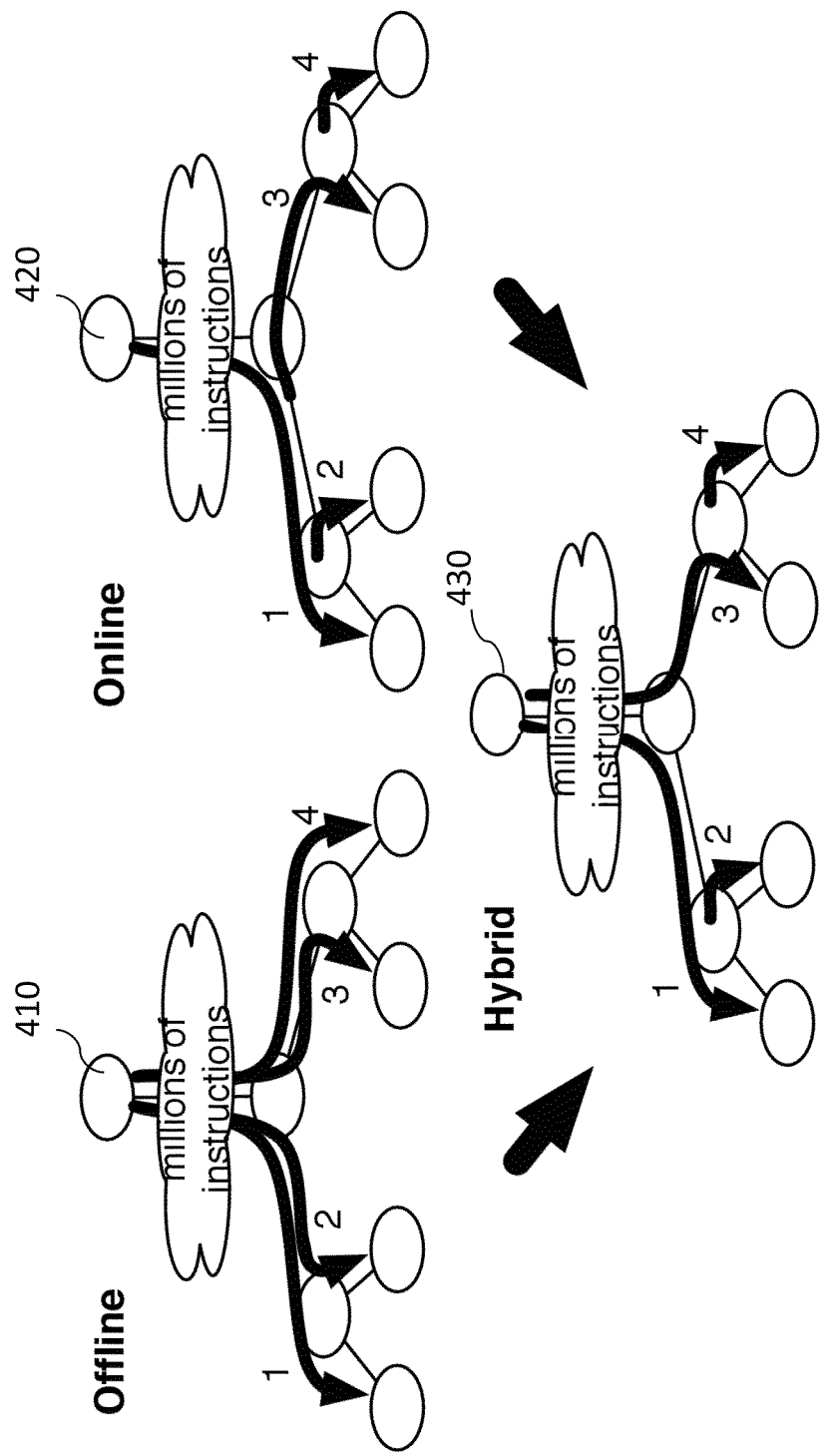
FIG. 4 is a schematic diagram illustrating hybrid execution in some example embodiments.

In order to visualize hybrid execution as managed by the management module 310, FIG. 4 depicts a comparison of both the online and offline approaches to the hybrid approach. Offline execution 410 follows four single paths (1, 2, 3, 4), while online execution 420 follows forked paths from a single path (2, 3, and 4 fork from 1). With hybrid execution 430, each of the single paths (1 and 3) lead to forked paths (2 from 1, 4 from 3), with checkpoints generated by the checkpoint module 320 at the forks and when the management module 310 switches the execution between the online and offline modes. Thus, the forking of paths is managed across the different active executing paths in order to optimize the performance of associated memory and other computing resources when detecting exploitable bugs in binary code, among other things.

Referring back to FIG. 3, in some example embodiments, the hybrid execution engine 150 also includes a memory module 350. In order to handle the loads on symbolic memory during symbolic execution, the hybrid execution engine, via the memory module 350, may generate and/or employ an index-based memory model, which allows the bug detection system 210 to treat the symbolic memory based on a value of an index associated with the memory resources utilized during execution.

In some example embodiments, the memory module 350 may select a portion of a memory resource based on an analysis of memory cells of the memory resource, and determine a set of values that are referenced by the selected portion of the memory resources by symbolic execution. For example, the memory module 350 may determine and/or encode a symbolic index and/or a set of linear functions as an index-based memory model that references and/or represents symbolic memory.

In some example embodiments, the memory module 350, therefore, is configured and/or programmed to generate, employ, and/or access an index-based memory model. For example, the memory module 360 may model the memory as a map $\mu:I \rightarrow E$ from 32-bit indices (i) to expressions (e). In a load($\mu$, i) expression, index i indexes memory $\mu$, and the loaded value e represents the contents of the ith memory cell. A load with a concrete index i is directly translated into an appropriate lookup in $\mu$ (i.e., $\mu[i]$). A store ($\mu$, i, e) instruction results in a new memory $\mu[i \leftarrow e]$ where i is mapped to e.

A symbolic index occurs when the index used in a memory lookup is not a number, but an expression—a pattern that appears in binary code. For example, a C switch(c) statement is compiled down to a jump-table lookup where the input character c is used as the index. Standard string conversion functions (such as ASCII to Unicode and vice versa, to_lower, to_upper, etc.) are all in this category. Handling arbitrary symbolic may be difficult, because a symbolic index may reference any cell in memory.

The memory module 350 may partially model memory, where writes are always concretized, but symbolic reads are allowed to be modeled symbolically. The memory model 350 uses memory objects to symbolically model memory. Similar to the global memory $\mu$, a memory object M is also a map from 32-bit indices to expressions. However, unlike the global memory $\mu$, a memory object is immutable. Whenever a symbolic index is used to read memory, the memory module 350 generates a fresh memory object M that contains all values that could be accessed by the index—M is a partial snapshot of the global memory. Using the memory object, the memory module 350 may reduce the evaluation of a load($\mu$, i) expression to M[i], which is semantically equivalent to returning $\mu[i]$, because the size of the symbolic array, the memory object M, may be orders of magnitude smaller than the entire memory $\mu$.

The memory module 350 may instantiate the memory object by finding all possible values of a symbolic index i (in a worst case, requiring $2^{32}$ queries to the solver for 32-bit memory addresses). The memory module 350 may exchange some accuracy for scalability by resolving the bounds [L,V] of the memory region—where L is the lower and V is the upper bound of the index. The bounds need to be conservative, where all possible values of the index should be within the [L,V] interval, although the memory region does not need to be continuous, for example, i might have only two realizable values (L and V).

To obtain these bounds, the memory module 350 may use the solver to perform a binary search (or other search trees) on the value of the index in the context of the current path predicate. For example, initially for the lowest bound of a 32-bit i: $L \in [0, 2^{32}-1]$. If $$i < \frac{2^{32}-1}{2}$$

is satisfiable then $$\mathcal{L} \in \left[0, \frac{2^{32}-1}{2} - 1\right]$$

while unsatisfiability indicates that $$\mathcal{L} \in \left[\frac{2^{32}-1}{2}, 2^{32}-1\right].$$

The process is repeated until both bounds are recovered. Using the bounds, the memory module 350 may instantiate the memory object (using a fresh symbolic array M) as follows:

$\forall i \in [L,U]: M[i]m[i]$.

In some example embodiments, the bounds resolution technique described above may sufficient to generate a conservative representation of memory objects, and allow the system to reason about symbolic memory reads. However, querying the solver on every symbolic memory dereference may be expensive (e.g., even with binary search, identifying both bounds of a 32-bit index required ~54 queries on average), the memory region may not be continuous, as even though many values between the bounds may be infeasible, they are still included in the memory object, and consequently, in the formula, the values within the memory object might have structure, because by modeling the object as a single byte array prevents optimizing formulas based on structures. Therefore, the memory module 350 may perform various optimization techniques.

The memory module 360 may utilize value set analysis (VSA) to reduce a server when resolving the bounds of a symbolic index (i). VSA returns a strided interval for a given symbolic index. A strided interval represents a set of values in the form $S[L,U]$, where S is the stride and L, U are the bounds. For example, the interval $2[1,5]$ represents the set $\{1,3,5\}$. The strided interval output by VSA will be an over-approximation of all possible values the index might have. For instance, $i=(1+byte)<<1$—where byte is a symbolic byte with an interval $1[0,255]$—results in an interval: $VSA(i)=2[2, 512]$. The strided interval produced by VSA is then refined by the solver (using the same binary-search strategy) to get the tight lower and upper bounds of the memory object. For example, if the path predicate asserts that byte<32, then the interval for the index $(1+byte)<<1$ can be refined to $2[2,64]$. Using VSA as a preprocessing step has a cascading effect on memory modeling (e.g., 70% less queries than without to resolve the exact bounds of the memory object, the strided interval can be used to eliminate impossible values in the [L,U] region, thus making formulas simpler, and the elimination can trigger other optimizations).

In some example embodiments, the VSA interval is refined using solver queries. The refinement process may be expensive (for example, the over-approximation returned by VSA might be too coarse). To avoid repeating the process for the same intervals, the memory module 350 may generate and/or maintain a cache that maps intervals to potential refinements. For example, when the memory module 350 identifies a cache hit, the memory module 350 may query the solver to check whether the cached refinement is accurate for the current symbolic index, before resorting to binary-search for refinement. The refinement cache can reduce the number of bounds-resolution queries by factors of 80% or more.

Checking an entry of the refinement cache may require solver queries, and the memory module 350 may utilize another level of caching to avoid repeatedly querying α-equivalent formulas (e.g., formulas that are structurally equivalent up to variable renaming). The memory module 350 may convert queried formulas to a canonical representation (F) and caches the query results (Q) in the form of a lemma: $F \rightarrow Q$. The answer for any formula mapping to the same canonical representation is retrieved immediately from the cache. The lemma cache may reduce the number of bounds-resolution queries by factors of 96% or more.

Any value loaded from a memory object M is symbolic. To resolve constraints involving a loaded value (M[i]), the solver needs to both find an entry in the object that satisfies the constraints and ensure that the index to the object entry is realizable. To lighten the burden on the solver, the memory module 350 may replace memory object lookup expressions with index search trees (ISTs). An IST is a [binary] search tree where the symbolic index is the key and the leaf nodes contain the entries of the object. The entire tree is encoded in the formula representation of the load expression.

More concretely, given a (sorted by address) list of entries E within a memory object M, a balanced IST for a symbolic index i is defined as: $IST(E)=ite(i<addr(E_{right}),E_{left},E_{right}))$, where ite represents an if-then-else expression, $E_{left}$ ($E_{right}$) represents the left (right) half of the initial entries E, and addr(•) returns the lowest address of the given entries. For a single entry the IST returns the entry without constructing any ite expressions. The above construction leads to a balanced IST. The memory module 350 may construct the IST with nested ite expressions—making the formula depth O(n) in the number of object entries instead of O(log n).

Figure 5A:
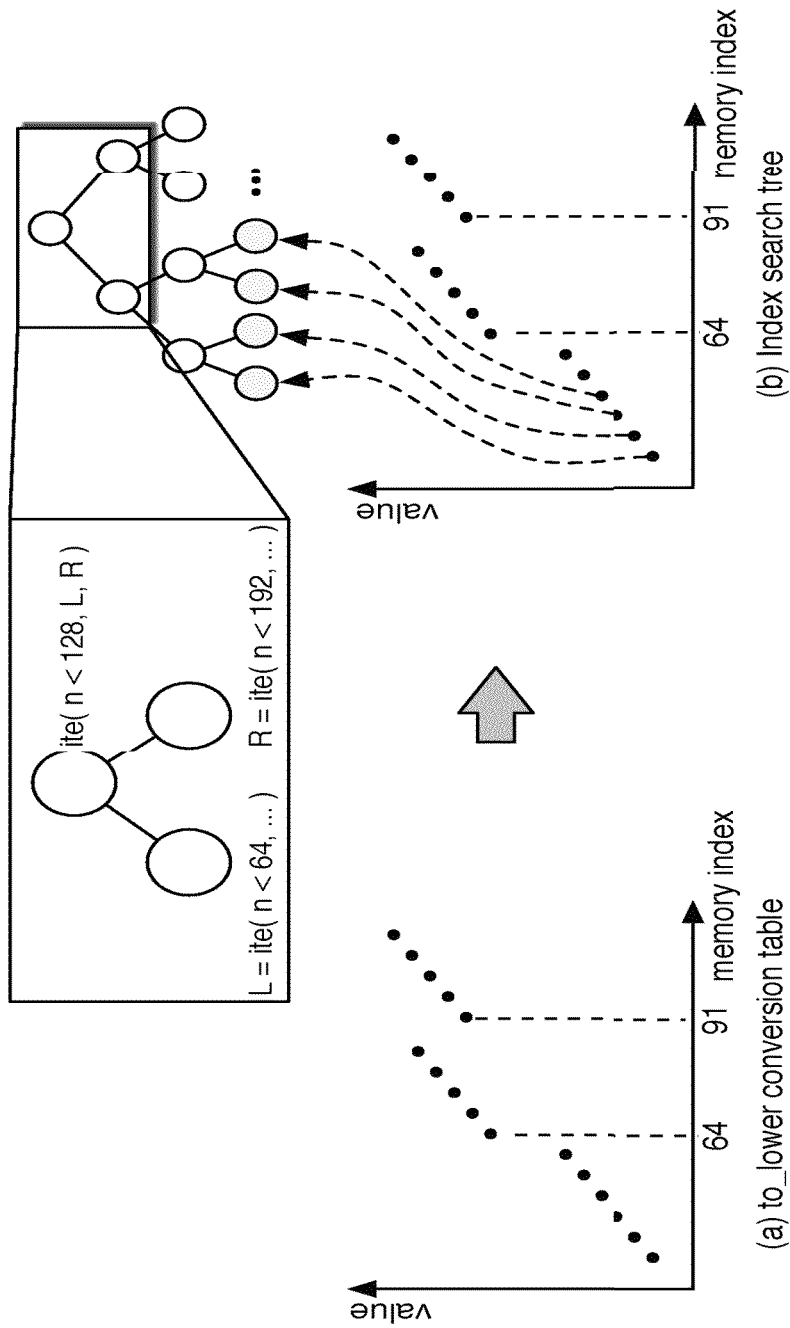
FIGS. 5A-5B are tables illustrating aspects of an index-based memory model, in some example embodiments.
Figure 5B:
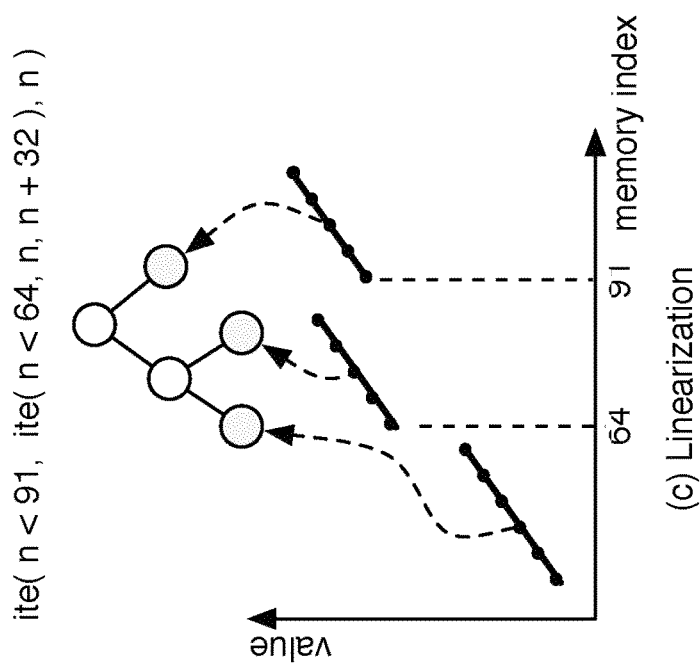

FIGS. 5A-5B are tables illustrating aspects of an index-based memory model, such as the construction of the IST when given the entries of a memory object (the to_lower conversion table) with a single symbolic character as the index. FIG. 5A depicts the to_lower conversion table, FIG. 5B depicts a generated IST, and FIG. 5C depicts the IST after linearization.

The IST generation algorithm creates a leaf node for each entry in the memory object. To reduce the number of entries, the memory module 350 may perform an extra preprocessing step before passing the object to the IST, in order to use the memory object structure to combine multiple entries into a single bucket. A bucket is an index-parameterized expression that returns the value of the memory object for every index within a range.

The memory module 350, therefore, may use linear functions to generate buckets and represent memory. The memory module 350 sweeps all entries within a memory object and joins consecutive points ((index,value) tuples) into lines, a process called linearization. Any two points can form a line $y=\alpha x+\beta$. Follow-up points $(i_i,v_i)$ will be included in the same line if $u_i=\alpha i_i+\beta$. At the end of linearization, the memory object is split into a list of buckets, where each bucket is either a line or an isolated point. The list of buckets can now be passed to the IST algorithm. FIG. 5A shows the to_lower IST after applying linearization. Linearization effectively reduces the number of leaf nodes from 256 to 3.

The idea of using linear functions to simplify memory lookups comes from a simple observation: linear-like patterns appear frequently for several operations at the binary level. For example, jump tables generated by switch statements, conversion and translation tables (e.g., ASCII to Unicode and vice versa) all contain values that are scaling linearly with the index.

Modeling a symbolic load using a memory object is beneficial when the size of the memory object is significantly smaller than the entire memory ($|M|<<|\mu|$). Thus, the above optimizations are only activated when the size of the memory object, approximated by the range, is below a threshold ($|M|<1024$ in our experiments).

Whenever the memory object size exceeds the threshold, the memory module 350 may concretize the index used to access the memory object. However, instead of picking a satisfying value at random, the memory module 350 may attempt to prioritize the possible concretization values. For example, for every symbolic pointer, the memory module 350 may perform the following checks:

Check if it is possible to redirect the pointer to unmapped memory under the context of the current path predicate. If true, the memory module 350 may generate a crash test case for the satisfying value;

Check if it is possible to redirect the symbolic pointer to symbolic data. If it is, the memory module 350 may redirect (and concretize) the pointer to the least constrained region of the symbolic data. By redirecting the pointer towards the least constrained region, the memory module 350 attempts to avoid loading overconstrained values, thus eliminating potentially interesting paths that depend on these values. To identify the least constrained region, the memory module 350 splits memory into symbolic regions, and may sort them based on the complexity of constraints associated with each region; and/or If all of the above checks fail, the memory module 350 may concretize the index to a valid memory address and continues execution.

The above steps may be used to infer whether a symbolic expression is a pointer, and if so, whether it is valid or not (e.g., NULL). For example, the following code snipper contains a buffer overflow at line 9:

```
typedef struct {
    int value;
    char * bar;
} foo;
int vulnerable (char * input)
{
    foo * ptr = init;
    buffer[100];
    strcpy(buffer, input);
    buffer[0] = ptr->bar[0];
    return 0;
}
```

Figure 6:
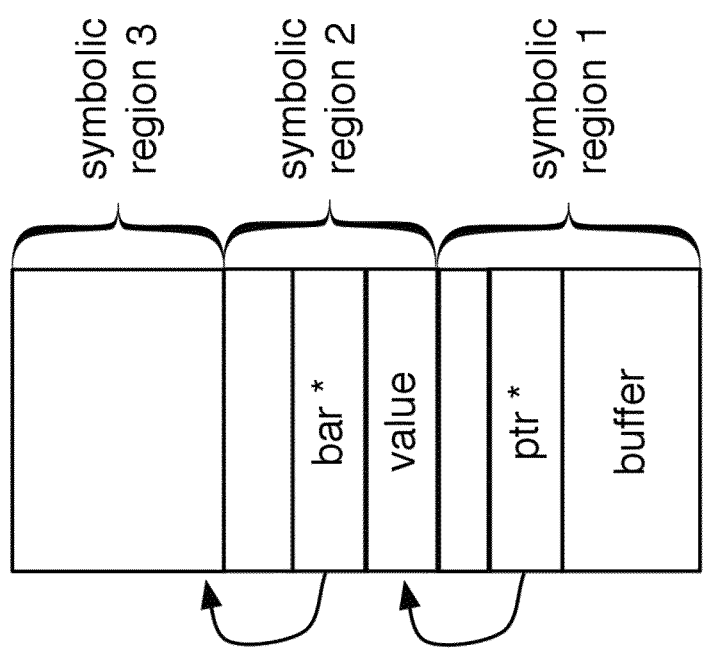
FIG. 6 is a block diagram illustrating an index-based memory model.

Following the example, an attacker is not guaranteed to hijack control even if strcpy overwrites the return address. The program needs to reach the return instruction to actually transfer control. However, at line 10, the program performs two dereferences both of which need to succeed (e.g., avoid crashing the program) to reach line 11 (note that pointer ptr is already overwritten with user data). The memory module 350 augmented with prioritized concretization will generate 3 distinct test cases: 1) a crash test case for an invalid dereference of pointer ptr, 2) a crash test case where dereferencing pointer bar fails after successfully redirecting ptr to symbolic data, and 3) an exploit test case, where both dereferences succeed and user input hijacks control of the program. FIG. 6 depicts the memory layout for the third test case, where the memory module 350 reconstructs symbolic data structures.

Figure 7:
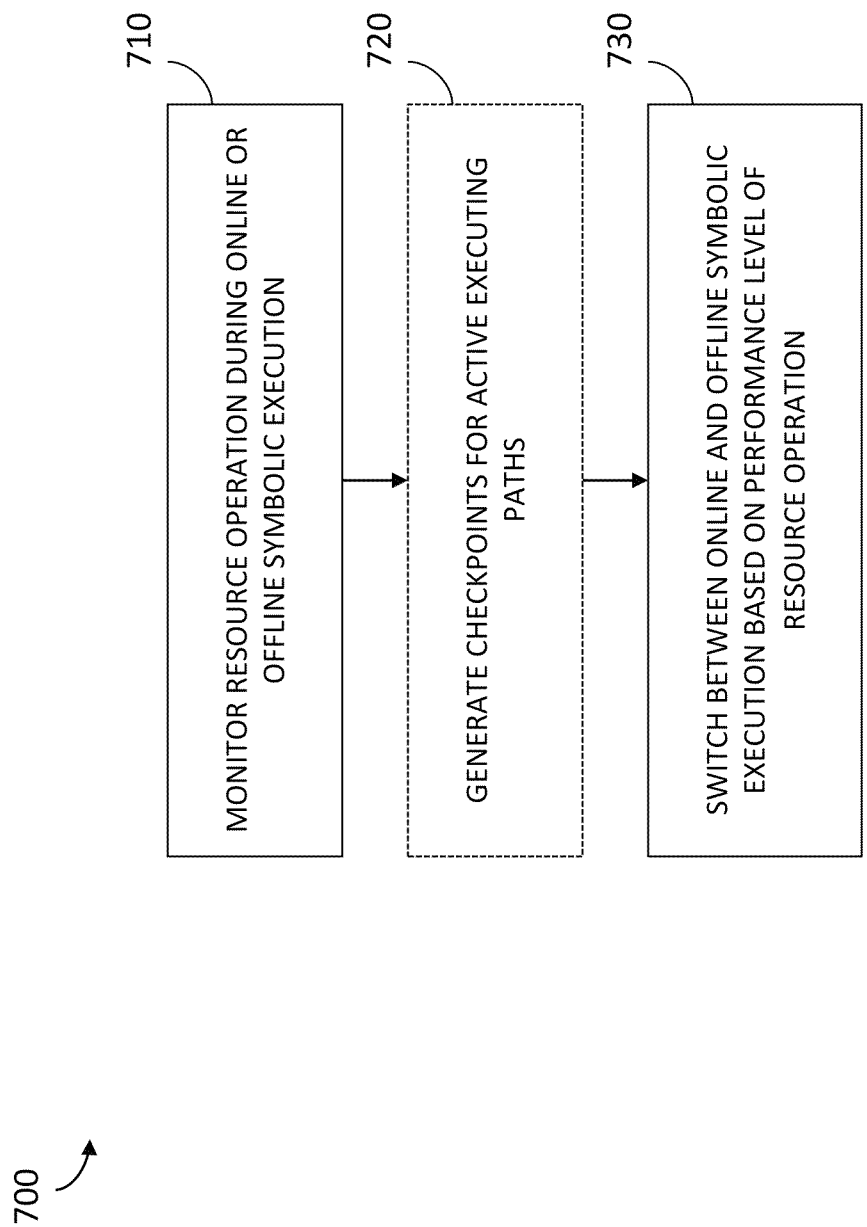
FIG. 7 is a flow diagram illustrating a method for performing hybrid symbolic execution on target code, in some example embodiments.

FIG. 7 is a flow diagram illustrating a method 700 for performing hybrid symbolic execution on target code, in some example embodiments. The method 700 may be performed by the hybrid execution engine 150 and, accordingly, is described herein merely by way of reference thereto. It will be appreciated that the method 700 may be performed on any suitable hardware.

In operation 710, the hybrid execution engine 150 monitors resources (e.g., memory, processors, and so on) associated with an execution client performing online or offline symbolic execution of a target program. For example, the management module 310 may monitoe and determine that a memory cap has been reached, such as a cap that identifies a condition associated with a low or unsuitable performance level (e.g., a slow performance) for a running symbolic execution. As another example, the management module 310 may determine an under-utilization of certain resources during a running symbolic execution.

In operation 720, the hybrid execution engine 150 optionally generates checkpoints for active executing paths of the online symbolic execution. For example the checkpoint module 320 may generate a checkpoint that includes the symbolic execution state of a suspended executor (path predicate, statistics, and so on) and replay information, for executing paths.

In operation 730, the hybrid execution engine 150 may cause the execution client to switch between online and offline symbolic execution based on a performance level of the monitored resources, such as in response to the determination that the resources are at or above the threshold performance level or cap, and/or are under-utilized during a symbolic execution. For example, the execution module 330 may interact with and/or be part of the SES 230, such as the symbolic evaluator 232, and initiate and/or intruct the CEC 220 to switch to an offline symbolic execution.

Figure 8:
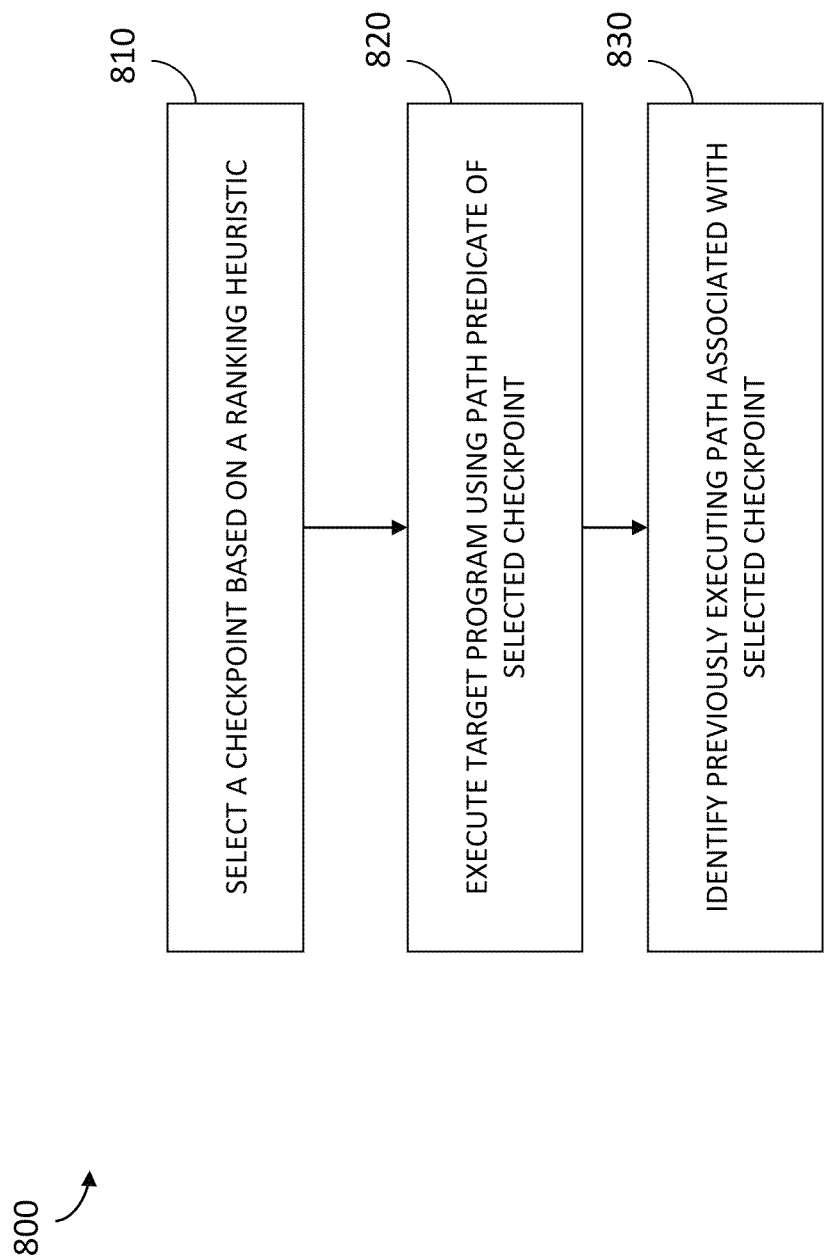
FIG. 8 is a flow diagram illustrating a method for restoring a checkpoint, in some example embodiments.

When the utilization and/or performance falls below a threshold—for example, because enough active execution paths are fully explored—the management module 310 may dictate a switch back to online execution, and restore the checkpoints associated with paused executing paths. FIG. 8 is a flow diagram illustrating a method 800 for restoring a checkpoint, in some example embodiments. The method 800 may be performed by the restoration module 340 and, accordingly, is described herein merely by way of reference thereto. It will be appreciated that the method 800 may be performed on any suitable hardware.

In operation 810, the restoration module 340 selects a checkpoint based on a ranking heuristic. For example, the restoration module 340 may select a checkpoint associated with the longest active path, or most recent active path.

In operation 820, the restoration module 340 executes the target program using the path predicate of the selected checkpoint. For example, because the symbolic execution state was saved with the checkpoint, the restoration module 340 may re-construct the concrete execution state by concretely executing the program using one satisfiable assignment of the path predicate as input, until the target program reaches the instruction when the execution state was suspended. In operation 830, the restoration module 340 identifies a previously executing path associated with the checkpoint.

As described herein, in some example embodiments, the bug detection system 210 may include an exploit generator 236 configured to automatically generate exploits for bugs detected during the performance of hybrid symbolic execution. For example, the bug detection system 210 may perform symbolic execution on target binary code using a first mode of symbolic execution, determine the first mode of symbolic execution has exhausted memory resources, perform symbolic execution on the target binary code using a second mode of symbolic execution, and detect one or more bugs within the target binary code based on the performed symbolic executions.

The bug detection system 210 may check for exploitable properties. Example exploitable properties include a symbolic (tainted) instruction pointer, a symbolic format string, command injection that causes unwanted additional commands to be executed by the target program, and so on. Whenever any of the exploitable policies are violated, the bug detection system 210 generates an exploitability formula and tries to find a satisfying answer (e.g., an exploit).

The bug detection system 210 may generate both local and remote attacks. For Windows, the bug detection system 210 may detect overwritten Structured Exception Handler (SEH) on the stack when an exception occurs, and tries to create an SEH-based exploit.

The bug detection system 210 may generate exploits for any possible instruction-pointer overwrite, commonly triggered by a buffer overflow. For example, when the bug detection system 210 finds a symbolic instruction pointer, it first tries to generate jump-to-register exploits. For this type of exploit, the instruction pointer should point to a trampoline, e.g. jmp %eax, and the register, e.g. %eax, should point to a place in memory where we can place our shellcode. By encoding those constraints into the formula, the bug detection system 210 is able to query the solver for a satisfying answer. If an answer exists, the bug is exploitable. If we can't generate a jump-to-register exploit, the bug detection system 210 generates a simpler exploit by making the instruction pointer point directly to a place in memory where we can place shellcode.

To identify and generate format string attacks, the bug detection system 210 checks whether the format argument of format string functions, e.g., printf, contains any symbolic bytes. If any symbolic bytes are detected, the bug detection system 210 tries to place a format string payload within the argument that will overwrite the return address of the formatting function.

To identify and generate command injection attacks, the bug detection system 210 may check whether the argument or arguments of command invocation functions (e.g., exec*, system, popen, and so on), contain any symbolic bytes. If any symbolic bytes are detected, the system 210 generates a formula to check whether a command injection payload may be placed in the function arguments, in order to execute the injected command. If the formula is satisfiable, an additional payload may be generated by getting a satisfying assignment for the symbolic variables. Command injection is not limited to programs written in typically type-unsafe languages (e.g., C/C++); programs written in type-safe languages are equally vulnerable to command injection attacks.

Of course, the bug detection system 210, hybrid execution engine 150, and various techniques described herein may be utilized for other tasks, including exploit generation, bug finding, verification and/or validation of the safety of software, and so on.

As described herein, in some example embodiments, the system, running on a computing machine, performs a hybrid symbolic execution (e.g., various combinations of offline and online symbolic execution) in order to detect exploitable bugs and other vulnerabilities in binary (e.g., executable) code, among other things.

FIG. 9 is a block diagram illustrating components of a machine 900, according to some example embodiments, able to read instructions from a machine-readable medium (e.g., a machine-readable storage medium and/or non-transitory machine- or computer-readable storage medium) and perform any one or more of the methodologies discussed herein, in whole or in part. Specifically, FIG. 9 shows a diagrammatic representation of the machine 900 in the example form of a computer system and within which instructions 924 (e.g., software, a program, an application, an applet, an app, or other executable code) for causing the machine 900 to perform any one or more of the methodologies discussed herein may be executed. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a peer-to-peer (or distributed) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include a collection of machines that individually or jointly execute the instructions 1124 to perform any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The machine 900 may further include a graphics display 910 (e.g., a plasma display panel (PDP), a light emitting diode (LED) display, a liquid crystal display (LCD), a projector, or a cathode ray tube (CRT)). The machine 900 may also include an alphanumeric input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a speaker), and a network interface device 920.

The storage unit 916 includes a machine-readable medium 922 on which is stored the instructions 924 embodying any one or more of the methodologies or functions described herein. The instructions 924 may also reside, completely or at least partially, within the main memory 904, within the processor 902 (e.g., within the processor's cache memory), or both, during execution thereof by the machine 900. Accordingly, the main memory 904 and the processor 902 may be considered as machine-readable media. The instructions 924 may be transmitted or received over a network 926 via the network interface device 920.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 900), such that the instructions, when executed by one or more processors of the machine (e.g., processor 902), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system, comprising:
a memory; and
one or more processors coupled to the memory and configured to:
monitor resources associated with an execution client performing symbolic execution of a target program that has a beginning, multiple execution paths, and multiple branch points among the multiple execution paths of the target program;
generate checkpoints for active symbolic execution paths of the symbolic execution;
cause the execution client to switch from a first mode of symbolic execution to a second mode of symbolic execution based on a performance level of the monitored resources, the execution client in the first mode being configured to fork multiple interpreters at a branch point encountered among the multiple branch points in symbolically executing an execution path among the multiple execution paths of the target program, the execution client in the first mode being configured to continue symbolic execution after the branch point without symbolic re-execution of any portion of the execution path prior to the branch point, the execution client in the second mode being configured to start a separate symbolic execution of the target program from the beginning for each branch point encountered in symbolically executing an execution path among the multiple execution paths of the target program;
restore the generated checkpoints by executing the target program using a path predicate for at least one checkpoint, the path predicate specifying conditions to execute a symbolic execution path to the at least one checkpoint; and
detect at least one bug based on the performed symbolic execution of the target program.

2. The system of claim 1, wherein:
the one or more processors are further configured to identify the active executing path based on the execution of the target program using the path predicate.

3. The system of claim 1, wherein:
the one or more processors are further configured to restore the generated checkpoints by concretely executing the target program using one satisfiable assignment of the path predicate associated with the checkpoint until the target program reaches the instruction when a previous execution state was suspended.

4. The system of claim 1, wherein:
the one or more processors are configured to detect an exploitable bug among the at least one bug based on the performed symbolic execution of the target program.

5. The system of claim 1, wherein:
the one or more processors are further configured to automatically generate at least one exploit based on the detected at least one bug.

6. The system of claim 1, wherein the performance level of the monitored resources is below a minimum threshold performance level.

7. The system of claim 1, wherein the performance level of the monitored resources is at or above a cap performance level.

8. A computer-implemented method, comprising:
using at least one processor, monitoring resources associated with an execution client performing symbolic execution of a target program that has a beginning, multiple execution paths, and multiple branch points among the multiple execution paths of the target program;
generating checkpoints for active symbolic execution paths of the symbolic execution;
causing the execution client to switch from a first mode of symbolic execution to a second mode of symbolic execution based on a performance level of the monitored resources, the execution client in the first mode being configured to fork multiple interpreters at a branch point encountered among the multiple branch points in symbolically executing an execution path among the multiple execution paths of the target program, the execution client in the first mode being configured to continue symbolic execution after the branch point without symbolic re-execution of any portion of the execution path prior to the branch point, the execution client in the second mode being configured to start a separate symbolic execution of the target program from the beginning for each branch point encountered in symbolically executing an execution path among the multiple execution paths of the target program;
restoring the generated checkpoints by executing the target program using a path predicate for at least one checkpoint, the path predicate specifying conditions to execute a symbolic execution path to the at least one checkpoint; and
detecting at least one bug based on the performed symbolic execution of the target program.

9. The method of claim 8, further comprising:
identifying the active executing path based on the execution of the target program using the path predicate.

10. The method of claim 8, wherein further:
the restoring of the generated checkpoints includes concretely executing the target program using one satisfiable assignment of a path predicate associated with the checkpoint until the target program reaches the instruction when a previous execution state was suspended.

11. The method of claim 8, wherein:
detecting an exploitable bug among the at least one bug based on the performed symbolic execution of the target program.

12. The method of claim 8, further comprising:
automatically generating at least one exploit based on the detected at least one bug.

13. The method of claim 8, wherein the performance level of the monitored resources is below a threshold performance level.

14. The method of claim 8, wherein the performance level of the monitored resources is at or above a cap performance level.

* * * * *